(12) United States Patent
Zhang et al.

(10) Patent No.: US 11,372,917 B2
(45) Date of Patent: Jun. 28, 2022

(54) LABELING VIDEO FILES USING ACOUSTIC VECTORS

(71) Applicant: META PLATFORMS, INC., Menlo Park, CA (US)

(72) Inventors: Ying Zhang, Palo Alto, CA (US); Yun Lei, San Francisco, CA (US)

(73) Assignee: META PLATFORMS, INC., Menlo Park, CA (US)

( * ) Notice: Subject to any disclaimer, the term of this patent is extended or adjusted under 35 U.S.C. 154(b) by 757 days.

(21) Appl. No.: 15/855,521

(22) Filed: Dec. 27, 2017

(65) Prior Publication Data

US 2019/0197187 A1   Jun. 27, 2019

(51) Int. Cl.
  *G06F 16/71* (2019.01)
  *G06N 3/08* (2006.01)
  *G06Q 50/00* (2012.01)

(52) U.S. Cl.
  CPC .............. *G06F 16/71* (2019.01); *G06N 3/08* (2013.01); *G06Q 50/01* (2013.01)

(58) Field of Classification Search
  CPC ........... G06F 16/71; G06N 3/08; G06Q 50/10
  See application file for complete search history.

(56) References Cited

U.S. PATENT DOCUMENTS

| | | | |
|---|---|---|---|
| 6,208,967 B1 * | 3/2001 | Pauws ..................... | G10L 15/04 704/256.8 |
| 10,176,500 B1 * | 1/2019 | Mohan ............... | G06Q 30/0277 |
| 2003/0018475 A1 * | 1/2003 | Basu ................. | G06K 9/00228 704/270 |
| 2012/0117087 A1 * | 5/2012 | Imoto ................. | G11B 27/034 707/749 |
| 2015/0139610 A1 * | 5/2015 | Syed ...................... | G11B 27/34 386/241 |

OTHER PUBLICATIONS

IBM Technical Disclosure Bulletin, "Speaker-Independent Labeling in Discrete-Parameter Continuous Speech Recognition Systems" (Year: 1994).*
Chandna et al. Monoaural Audio Source Separation Using Deep Convolutional Neural Networks (Year: 2017).*
Galatas et al. "Audio Visual Speech Recognition in Noisy Visual Environments" PETRA 11: Proceedings of the 4th International Confererence on PErvasive Technologies Related to Assistive Environments. Article No. 19 pp. 1-4 (Year: 2011).*

* cited by examiner

Primary Examiner — Mark D Featherstone
Assistant Examiner — Kweku William Halm
(74) Attorney, Agent, or Firm — Jordan IP Law, LLC

(57) ABSTRACT

In one embodiment, a method includes receiving a video file. The video file includes a corresponding audio stream. The method further includes accessing the audio stream, and generating, based on the audio stream, a representative vector. The vector has a particular number of dimensions. The method further includes accessing a label-embedding space, which has the same particular number of dimensions, and includes a number of regions that each correspond to a respective label. The method further includes determining a region of the label-embedding space that corresponds to the vector, the determined region corresponding to a particular label. The method further includes associating the particular label with the video file.

20 Claims, 8 Drawing Sheets

US 11,372,917 B2

LABELING VIDEO FILES USING ACOUSTIC VECTORS

TECHNICAL FIELD

This disclosure generally relates to using a trained neural network to analyze content files stored on a social network.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, video files may be shared to a social-networking system. The video files may be provided by a user of the social-networking system or any entity associated with the social-networking system. Video files on the social-networking system may be labelled to provide tags or other information. Labels may be used, for example, to help other users search for the video file. In particular embodiments, the labels for a video file may be used to recommend or present the video file to a user who may be interested in the subject matter of the label.

In particular embodiments, labels may be automatically determined by the social-networking system based on the video file. In particular embodiments, the audio stream of the video file may be accessed. The audio stream may be converted by a neural network of the social-networking system into one or more vectors having n dimensions. The value of n may be determined to be a number high enough so that different audio streams may have different vectors, while similar or identical audio streams may have similar or identical vectors. The neural network may be trained using a set of pre-labeled video files that may also have their audio streams converted into vectors. Based on the training vectors and the associated labels for the respective video files, the social-networking system may determine an embedding space having n dimensions, where particular regions of the embedding space may correspond to one or more particular labels. In particular embodiments, different types of labels may use different embedding spaces or regions. For example, the embedding space for labels showing a genre of the video may have different regions compared to an embedding space for labels showing a language of the video. In particular embodiments, the social-networking system may divide a single audio stream for a video file into multiple segments, and generate vectors for each segment for training and generating the embedding space. In particular embodiments, for a newly-received video file, the social-networking system may use a neural network to generate one or more vectors, and compare the vectors to one or more embedding spaces to determine labels to attach to the new video file.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
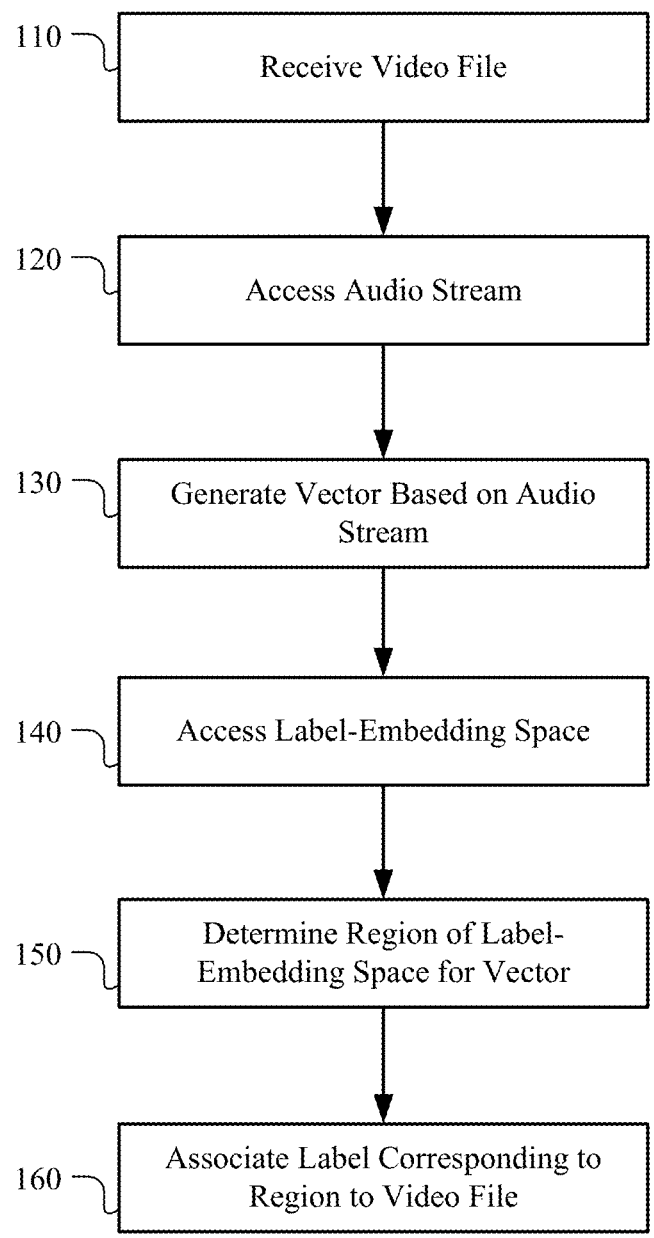
FIG. 1 illustrates an example method for determining labels to be associated with a video file.

In particular embodiments, media content such as a video file may be uploaded and stored on a social-networking system. In particular embodiments, the media content may be shared with one or more users of the social-networking system.

In particular embodiments, users may search for particular videos shared on the social-networking system. In particular embodiments, users may search for videos with particular attributes. As an example and not by way of limitation, a user may search for videos relating to cats, a particular sports team, a musical artist, etc. In particular embodiments, a user may also search for video files associated with a particular another user, such as by uploading user, or a user that is depicted in the video file. In particular embodiments, information about a particular video file may be appended as a "label" to the particular video file on the social-networking system. As an example and not by way of limitation, a user may search for videos related to "cats." The social-networking system, in response to the received search query, may determine one or more video files that are each associated with the label "cat." The social-networking system may then send those labelled videos to the user. In particular embodiments, labeled videos may be presented to users based on the user's interest in the subject matter of the label. Continuing the example above, a particular user may have indicated an interest in cats. The social-networking system may present the "cat"-labeled videos to the user, for example through a newsfeed or other story. In particular embodiments, a single video file may be associated with multiple labels for different topics. As an example and not by way of limitation, a video depicting cats and dogs may be appended with labels for "cats," "dogs," "pets," "animals," "short video," "appropriate for all ages," "outdoors," etc. In particular embodiments, the labels for a particular video on the social-networking system may be defined by one or more users. As an example and not by way of limitation, the user uploading the video may provide one or more labels to be appended to the video. In particular embodiments, other users, e.g. friends of the uploading user or viewers of the video, may also add labels. In particular embodiments, one or more administrator users of the social-networking system may add any labels as required.

In particular embodiments, it may be desirable to automatically assign semantic labels for a video file based on the content of the video file. In particular embodiments, a social-networking system may determine labels for a particular video file based on the acoustic signature of the video file. In particular embodiments, unique video files may have unique acoustic signatures based on their corresponding audio streams or tracks. In particular embodiments, the acoustic signature of a particular video file may be represented by one or more vectors based on the data in the audio stream. As an example and not by way of limitation, a vector may be created for a particular video file by taking the entire digital audio stream and converting it to a vector in n-dimensional space. In particular embodiments, the size of n in the n-dimensional space may be determined as a number high enough that different audio tracks will have different vectors in the n-dimensional space, but not so high as to make determination and comparison of vectors computationally expensive. In particular embodiments, by comparing the vectors of a plurality of video files, the differences in particular characteristics of the audio streams in the video files may be determined. In particular embodiments, the differences in the audio streams may be used to determine one or more labels for the respective video files.

In particular embodiments, an embedding space may be first created for audio stream vectors based on a set of existing video objects and associated tags. As an example and not by way of limitation, a social-networking system may already have in a database a set of video files uploaded by a plurality of users, as well as corresponding sets of labels that have been submitted by users, administrators of the social-networking system, or by any other suitable entity. In particular embodiments, the social-networking system may determine a set of corresponding audio stream vectors for the video files in the database by converting the audio streams into data in n-dimensional space. In particular embodiments, the social-networking system may use machine-learning algorithms, deep neural networks, or any other suitable methods to determine the appropriate value of n for the video files. In particular embodiments, the social-networking system may determine that n should be high enough so that each label that may be assigned to a video may have a unique region in one or more dimensions in the n-dimensional space, so that audio streams for videos having that label fall within that unique region, and audio streams for videos not having that label would not fall within that unique region when converted into a vector. As an example and not by way of limitation, the social-networking system may determine that a 200-dimensional space is appropriate for ensuring that each label is provided its own unique region, while keeping calculations from being too computationally expensive. In particular embodiments, the social-networking system may determine a plurality of embedding spaces that are each used for a different type of label. As an example and not by way of limitation, the audio streams from video files may be extracted into a 100-dimensional vector for labels relating to language, while also being converted into a 50-dimensional vector to determine labels relating to genre, and a 200-dimensional vector for labels relating to hashtags. In particular embodiments, the social-networking system may determine the number of dimensions to be used in each embedding space separately. In particular embodiments, the social-networking system may use the same number of dimensions for each embedding space. In particular embodiments, the social-networking system may use a different conversion method for converting the audio stream into vectors based on the embedding space. As an example and not by way of limitation, the same audio stream may be converted into a one 50-dimensional vector for an embedding space directed to language, and a different 50-dimensional vector for an embedding space directed to genre. In particular embodiments, the social-networking system may generate identical vectors in different embedding spaces, while assigning different regions within different embedding spaces.

In particular embodiments, the social-networking system may receive a new video file uploaded by a user or entity to the social-networking system. In particular embodiments, the social-networking system may automatically determine one or more labels to attach to the new video file. In particular embodiments, the one or more labels may be automatically determined by extracting the audio track from the new video file and converting it into a vector that may be used with one or more embedding spaces of the social-networking system. In particular embodiments, the audio track may be converted into multiple vectors, each vector being used for a particular embedding space. In particular embodiments, the social-networking system may determine a plurality of labels corresponding to the vectors' positions in the one or more embedding spaces. As an example and not by way of limitation, for a new video file uploaded to the social-networking system, the social-networking system may generate one or more vectors in the one or more embedding spaces and determine that the vectors are within regions in the embedding spaces that correspond to the labels "English," "fast music," "comedy," "monologue," and "#thedailyshow." These labels may correspond to particular regions in embedding spaces for language spoken, type of music (if any) present, genre, type of speech (if any) present, and hashtags. In particular embodiments, the social-networking system may generate a general-use vector in n-dimensional space for the audio stream, then for a particular embedding space, convert the general-use vector into a label-specific vector in m-dimensional space, where m is a lower value than n, and m is specific to the particular embedding space being determined.

In particular embodiments, the social-networking system may utilize a trained algorithm to determine the embedding spaces and assign vectors to new video files. In particular embodiments, the trained algorithm may be created using a deep neural network, or neural net. In particular embodiments, a deep neural network may comprise a plurality of "neurons," which are particular algorithms that output a value (e.g. 0 or 1) for a particular input. As an example and not by way of limitation, if the input data is an image, individual neurons of a neural network may be trained to output values based on: the amount of red coloration in the image; the total contrast in the image; an aspect ratio of the image; the presence of sharp edges in the image; or the presence of human-shaped objects in the image, respectively. Only one or a few neurons in the neural network may be trained for individual features, then the output of the neurons may be combined to reflect all features that the neural network is looking for. In particular embodiments, a neural network may utilize a large number of neurons to determine a set of outputs for a given input, such as the audio stream from a video file. As an example and not by way of limitation, a neural network may be used to determine individual features of an audio stream such as: amount of human speech, frequency or pitch of human speech, presence of particular musical instruments in the audio stream, presence of any scene changes within the audio stream, the presence of sudden volume increases or decreases, or any other appropriate feature. In particular embodiments, the neurons of the neural network may also be used to determine the vector for the audio stream. As an example and not by way of limitation, the individual dimensions of an embedding space may correspond to one or more individual features of the audio stream being detected by one or a few neurons of the neural network, and the vector's value in a particular dimension may correspond to the neurons' outputs for the particular corresponding features.

In particular embodiments, a deep neural network may be trained using a set of training data, where the inputs and outputs are previously known, in order to adjust the output of individual neurons to ensure more accurate results. In particular embodiments, the training data may include all previously-labeled video files of the social-networking system, or a subset of the video files. In particular embodiments, these video files may already be associated with indications of labels such as user posts that embed or reference the video file, comments, captions, hashtags, indications of particular webpages the video has been shared on, etc. The neural network may determine for a particular video file a set of labels based on this data even without explicit assignment of a particular label to a video. As an example and not by way of limitation, a particular video may be shared on the social-networking system without comment by a particular user. The video may then be shared to a webpage of the social-networking system that is a fan page for the Golden State Warriors. The social-networking system may determine that the video should be appended with a label for the Golden State Warriors such as "#gswarriors" based on the video's presence on that fan page, without any other user inputs being necessary.

In particular embodiments, the social-networking system may convert each video file in the training data set to one or more vectors. As discussed above, the particular method of creating the vectors (or the number of dimensions used) may be adjusted based on the ability of the neural network to differentiate different videos while identical or near-identical videos may have identical or similar vectors. As an example and not by way of limitation, if the neural network determines that two video files in the training data with very different labels have corresponding vectors that are less than a threshold distance apart from each other, the neural network may determine that a different method of calculating vectors or a larger number of dimensions used may be necessary so that the corresponding vectors are different. In particular embodiments, the calculated vectors may still be small enough compared to the original video file or the audio stream so that the calculations of the embedding space and the determination of labels is not too computationally expensive. In particular embodiments, the social-networking system may adjust its methods for creating vectors and embedding spaces over time as new video files and labels are added to the training data. In particular embodiments, the methods may be adjusted based on feedback from users or other entities of the social-networking system. As an example and not by way of limitation, if based on the initial set of training data, the neural network determines a set of labels for a new video file, and subsequently users modify or delete some of the labels, the social-networking system may determine the subsequent user action as a negative feedback on the neurons and adjust the algorithms for one or more of the neurons in the neural network, which may affect the initial determinations of the vectors and embedding spaces. In particular embodiments, the social-networking system may then adjust the method of determining vectors or the method of allocating regions of the embedding spaces.

In particular embodiments, the social-networking system may determine one or more labels for a particular video file by generating a plurality of vectors for the video file in a particular embedding space, wherein each of the vectors correspond to a particular time segment of the audio stream. As an example and not by way of limitation, a particular video file used as training data by the social-networking system may be 1 minute long. The social-networking system may extract the corresponding 1-minute audio stream, then divide the audio stream into 10-second segments. In particular embodiments, the segments may not be overlapping, so that six 10-second segments may be created. In particular embodiments, the segments may overlap each other by some amount of time. As an example and not by way of limitation, for the 1-minute audio stream, the first segment may be between 0:00 and 0:10, the second segment between 0:05 and 0:15, the third segment between 0:10 and 0:20, and so on, until the last (in this case, 11th) segment is between 0:50 and 1:00. In this example, for any point in time between 0:05 and 0:55 of the total audio stream, two segments may capture the audio at that time. In particular embodiments, the social-networking system may introduce additional overlapping segments so that at least some portion of the audio stream is captured by two or more segments.

In particular embodiments, the social-networking system may generate one or more vectors for each segment from the audio stream. The vectors may be generated using any suitable method and in any suitable number of dimensions as described above. In particular embodiments, the neural network of the social-networking system may then use each of these vectors in an appropriate embedding space as a training input to determine the location of particular labels in the embedding space. As an example and not by way of limitation, for the 1-minute video file uploaded to the social-networking system with 11 overlapping 10-second segments, the neural network may determine 11 vectors that correspond to the embedding space for "genre." In this example, the overall video may be a trailer for an English-language action movie, and may have already been labeled as "English," "action," "exciting music," etc. For each of the 11 vectors from the audio stream, the neural network may determine whether the coordinates of each vector in the "genre" embedding space should correspond to the region for "action." In particular embodiments, not every vector from the set of 11 vectors from this audio stream may actually correspond to "action," for example, if the movie trailer has quiet scenes that would not reflect the overall genre. In particular embodiments, while determining regions for the embedding space solely based on the vectors from a single video file may not necessarily be accurate, by using a large number of video files (and corresponding audio streams) as inputs, the neural network of the social-networking system may determine whether any false positives actually exist. In particular embodiments, the training results may be verified by an administrator of the social-networking system or any other suitable entity. As an example and not by way of limitation, after determining the regions for the genre embedding space, the neural network may determine that 2 out of the 11 vectors from the example video file discussed above do not correspond to a region for "action" in the embedding space, but instead should be "comedy." The neural network may send the audio stream and/or video file with its determined labels to a human or computer supervisor, who can confirm that these segments do actually correspond to "comedy," or note that this label is wrong and either input a corrected label, or return the negative feedback to the neural network to determine a different output. In particular embodiments, the supervised feedback may also be used to determine whether the neural network has been accurately trained for detecting labels on new video files. As an example and not by way of limitation, a human or computer supervisor may review some or all labels output by the neural network for a particular period of time, and determine the rate at which the neural network was correct. The accuracy of the neural network may be judged by whether the neural network added any incorrect labels to an audio stream (e.g. a false positive) or failed to add a correct label to an audio stream (e.g. a false negative). In particular embodiments, the social-networking system may require that the rate of false positives, false negatives, or both, to be below a threshold value before determining that the neural network has been properly trained. In particular embodiments, even after determining that the neural network has been trained, periodic review of the accuracy of the neural network may be performed over time to ensure that the accuracy of the neural network has not slipped, which may require additional training.

In particular embodiments, users of the social-networking system may provide positive or negative feedback on labels determined by the neural network. As an example and not by way of limitation, the social-networking system may present one or more video files to one or more users, where the video files are appended with labels as determined by the neural network, which may not necessarily be identical to the labels previously provided by users or other entities when the video files were provided to the social-networking system. In particular embodiments, the users may be asked to confirm or correct the labels on such a video file. In particular embodiments, the social-networking information may determine whether the labels are correct based on other information known about the users of the social-networking system, such as user interests, demographics, user groups, etc. As an example and not by way of limitation, for a particular video file, the neural network may have determined that the subject matter of the video file includes birds, and therefore the neural network may have appended the label "#birds" to the video file. The video file may be presented to one or more users, for example on a newsfeed or other display of content of the social-networking system. In particular embodiments, a user may see a preview or screenshot of the video file before selecting the video file to watch the full video. In particular embodiments, the social-networking system may determine that a number of users who have been presented with a preview or screenshot of the video have indicated an interest in birds. As an example and not by way of limitation, a user may have input "birds" as one of his or her interests; the user may be a member of user group related to birds; or the user may have a history of interacting with content related to birds. In this example, for the users interested in birds, the social-networking system may determine whether these users are interacting with and viewing the video file labeled with "#birds." In particular embodiments, if the rate of "bird" users interacting with the video file exceeds a threshold rate, the social-networking system may determine that the label "#birds" is correct. In particular embodiments, if the average view time of "bird" users for this video file exceeds a threshold time (or percentage of the video), the social-networking system may determine that the label "#birds" is correct. Conversely, if either the viewing rate or viewing time of the "bird" users is below a threshold rate or time, the social-networking system may treat that fact as a negative feedback to the "#birds" label, indicating that this label may be incorrect. In particular embodiments, the social-networking system may send both positive and negative feedback for the label back to the neural network in order to determine whether the neural network algorithms should be adjusted.

In particular embodiments, the embedding spaces and determination of vectors by the neural network may be adjusted based on other available information from the video file. In particular embodiments, image recognition may be performed on one or more frames of the video file to determine one or more objects that are depicted within the video file. In particular embodiments, the image recognition may be used to confirm labels, or indicate that a label may be incorrect. As an example and not by way of limitation, for the video file discussed above with the label "#birds", the social-networking system may perform image recognition on one or more frames of the video file to determine whether any birds are actually depicted within the video file. In particular embodiments, determining that a bird is depicted may be sufficient to provide positive feedback on the label. Conversely, determining that no analyzed frame from the video file depicts a bird may be used as negative feedback. As another example, a video file may be presented with captions (in the same language as the audio) or subtitles (e.g. text in a different language from the audio). The social-networking system may detect the displayed audio and determine a language spoken in the audio, as well as detect the language used in the text of the video. If the spoken language and the text language are identical, the social-networking system may determine that the same language may be used as a label for the video file. As an example and not by way of limitation, if the audio of the video file contains spoken English, and the captions in the video file are recognized as English, the video file likely may be determined as an "English" video file for a language label. However, in particular embodiments, the languages may differ. This may be due to the use of subtitles, or an incorrect determination of at least one of the languages used. As an example and not by way of limitation, the social-networking system may determine that the language spoken in the audio of the video file is French, but the text displayed in the video file is German. In particular embodiments, the social-networking system may use both labels "German" and "French" as languages associated with the video file. In particular embodiments, the social-networking system may determine the language of one or more comments or posts associated with the video file. As an example and not by way of limitation, the video file may be uploaded by a particular user with a comment, followed by other comments and replies regarding the thread. In the example provided above, if the uploading user is known to be German, and most of the comments in response to the user posting the video file are in German, then the social-networking system may determine that only German is the appropriate label. As another example and not by way of limitation, the social-networking system may use social-networking information to replace an automatically-determined label. One such example may be based on a video file where the audio stream includes mention of the word "spurs" and sounds of sports fans. The neural network may determine from vectors generated from such an audio stream that the video file must be referring to the San Antonio Spurs, an NBA team. However, the users of the social-networking system who view this video file may have little to no association with the San Antonio Spurs, but have interest or a connection to Tottenham Hotspur (also called "Spurs"), an English soccer team. In such an example, the social-networking system may determine that rather than appending a label relating to the basketball team, the video file should be appended with a label referencing the soccer team.

In particular embodiments, the social-networking system may use the neural network after it has been trained to assign new labels to a newly-provided video file. In particular embodiments, the method of appending labels may be similar to the method for training the neural network. In particular embodiments, the social-networking system may receive a new video file. The new video file may be uploaded by a user of the social-networking system, or any other entity. In particular embodiments, the new video file may already be associated with one or more labels. As an example and not by way of limitation, the uploading user or entity may specify one or more labels that should be attached to the video. In particular embodiments, information about the uploading user or entity may be used to pre-determine one or more labels. As an example and not by way of limitation, the video file may be uploaded by the administrator of the fanpage for "the Los Angeles Rams." The social-networking system may determine that any video files uploaded to or by this fanpage is very likely related to "football," and therefore append a label "football" to the video file. In particular embodiments, the social-networking system may also append labels such as "#larams" to the video file, based on the individual identity of the user or entity. In particular embodiments, a user or entity may not add any labels to an uploaded video, and the social-networking system may automatically determine one or more labels for the video file. In particular embodiments, the social-networking system may add one or more labels to a video file that already has one or more existing labels.

In particular embodiments, the social-networking system may determine labels based at least in part on an association between one or more users of the social-networking system or users and entities of the social-networking system through a social graph. As discussed in further detail below, a social graph may comprise a number of nodes and edges connecting the nodes. Each node may correspond to a particular user, group, concept, or other distinct entity. In particular embodiments, an edge between two nodes may represent a connection or association between the corresponding entities. As an example and not by way of limitation, a particular node of the social graph may correspond to the user Alice, while another node may correspond to a concept node for the place First Street Cafe, a restaurant. An edge between the node for Alice and the node for the restaurant may indicate that Alice has liked or commented on a webpage of the social-networking system corresponding to the First Street Cafe, checked in at the First Street Cafe, or joined a group associated with the First Street Cafe. In particular embodiments, the edge may indicate the presence of any type of relationship between Alice and the restaurant. In particular embodiments, the social-networking system may determine one or more labels based on the connected nodes to a user associated with the video file. As an example and not by way of limitation, user Alice may upload a video file that she captured while sitting inside the First Street Cafe. In this example, there may be another restaurant next to the First Street Cafe. Based on the audio vectors from the audio stream of the video file, the social-networking system and neural network may determine that the video is taken from inside a restaurant, and attach an appropriate label, e.g. "Lunch." In particular embodiments, by determining that Alice has a connecting edge on the social graph to the entity node for First Street Cafe, but not the other restaurant, the social-networking system may be able to further determine a label for "First Street Cafe."

In particular embodiments, when the social-networking system determines new or additional labels to associate with a video file, the social-networking system may determine one or more vectors for the audio stream associated with the video file. In particular embodiments, the social-networking system may access the video file and extract the portion of the data corresponding to the audio stream. In particular embodiments, as discussed above, the social-networking system may generate a plurality of vectors based on the time segments in the audio stream. In particular embodiments, the method used to generate the vectors may be identical to a method used to generate vectors in one or more embedding spaces used by the neural network. In particular embodiments, the neural network may be used to take the audio stream, or a portion of the audio stream, and generate the vectors. In particular embodiments, the vectors may be generated by a plurality of neurons of the neural network, wherein each neuron is responsible for determining one or more components of each vector. As an example and not by way of limitation, for a neural network, a particular neuron may be used to detect sudden volume changes in the audio stream, which may be used in one or more dimensions that may indicate "action," "suspense," "scene change," or any other suitable characteristic of the audio stream which may be incorporated into the vectors. In particular embodiments, once the one or more vectors are generated for the audio stream, the social-networking system may determine one or more labels for the vectors based at least partially by comparing the vectors in one or more embedding spaces to the labels mapped onto the one or more embedding spaces. In particular embodiments, the social-networking system may determine labels only if the average value of a plurality of vectors corresponds to the corresponding region for the label in the embedding space. As an example and not by way of limitation, for a particular video file, the social-networking system and neural network may generate ten vectors based on the time segments of the audio stream. Each of these ten vectors may be in an embedding space for genre.

In particular embodiments, the arithmetic or geometric mean of the ten vectors may fall into the region for "news segment," even if only a few or even none of the individual segments actually correspond to the "news segment" region. In particular embodiments, the social-networking system may determine labels if at least a threshold number of vectors from the plurality of vectors correspond to the corresponding region for the label in the embedding space. As an example and not by way of limitation, continuing the example above, the social-networking system may determine that the audio stream corresponds to the genre "news segment" only if at least three of the ten vectors correspond to a region for "news segment." In particular embodiments, the social-networking system may require that a plurality of the individual vectors correspond to a region for a label in order to attach that label to the video file. As an example and not by way of limitation, if three of the vectors correspond to "news segment," but four of the vectors correspond to "historical documentary," the social-networking system may determine that the "historical documentary" label should be attached instead. In particular embodiments, the social-networking system may append multiple labels in the same embedding space if more than a threshold number of vectors correspond to the region. As an example and not by way of limitation, in the example above, the social-networking system may determine that both labels "news segment" and "historical documentary" should be attached to the video file. In particular embodiments, the social-networking system may weight one or more of the vectors from a plurality of vectors for an audio stream based on other factors. As an example and not by way of limitation, the social-networking system may weigh the values of vectors corresponding to the middle time segments of the audio stream greater than the beginning or the end. In this example, the social-networking system may assume that the actual subject matter for the video file may be in the middle of the video file, whereas the beginning segments may be an introductory segment or opening credits, while the terminal segments may be closing credits, advertisements, or a transition to a different video file. In such an example, the social-networking system may weigh the vector values of the middle segments more heavily if it is considering a mean value of the vectors, or provide them with greater weight in meeting a required threshold of vector segments for determining a label.

In particular embodiments, the social-networking system may determine that for particularly long video files or video files directed to multiple segments, it may be necessary to assign different sets of labels to different portions of the video file. As an example and not by way of limitation, if the video file is a 30-minute local news show, each separate segment, such as weather, traffic, sports, local news, and national news, may each have their own corresponding labels determined by the social-networking system. Even within a particular segment, each individual news story may have separate labels attached based on subject matter or format of the story. In particular embodiments, the social-networking system and neural network may divide the segments for such a video file by determining one or more scene transitions in the audio file. In particular embodiments, a scene transition may be detected by a change in the background audio (e.g. music or soundtrack), speaker, cadence of voice, or any other changes in the audio stream. In particular embodiments, segments divided in such a manner may not be equal in time length. As an example and not by way of limitation, for the news show discussed above, a segment relating to the sports segment may be three minutes long, while the weather segment may be one minute long. In particular embodiments, the social-networking system may divide longer segments into multiple shorter segments to approximate the length of the shorter segments. Continuing the example above, the social-networking system may create three one-minute segments for the sports segment. In particular embodiments, the social-networking system may generate one or more vectors for each divided segment, and compare the vectors to one or more embedding spaces in order to determine labels as described above.

In particular embodiments, the social-networking system may divide long video files, or potentially ongoing, live streams of video, based on time segments. As an example and not by way of limitation, the social-networking system may be receiving and sharing a live video session uploaded by a user or entity. Due to the live nature of the video stream and the potential for the total length of the video to be unknown to the social-networking system (and possibly to the sharing user as well), it may be impractical to wait until the entire video has been shared to attach labels to the video. In this example, more timely determination of labels may be desirable so that other users searching for videos relating to the labels may be able to find and view the video while the live streaming is in progress. In particular embodiments, the social-networking system may divide the live video stream into smaller segments, and determine labels separately for each segment. As an example and not by way of limitation, for a live video stream, the social-networking system may take the most recent 15 seconds of video, extract the audio stream, and determine the labels for that 15-second portion of the video stream. In particular embodiments, the social-networking system may repeat that process every 15 seconds (or at any other reasonable interval) to update the labels for the video stream, if necessary. As an example and not by way of limitation, the news show discussed in examples above may be posting to the social-networking system as a live video. While the news show is on the sports segment, the labels attached to the live video may be directed to sports as well, so that a user searching for sports news may be directed to that video. However, when the news show subsequently moves on to discuss a political news story, the social-networking system may remove the sports labels and add politics labels instead. In such an example, a user who then searches for sports videos may not see the news show video, while a user searching for (or interesting in) politics may be presented with the news show video.

In particular embodiments, the social-networking system may divide a video file into one or more segments based on recognition of multiple speakers in a video. As an example and not by way of limitation, a video file shared to the social-networking system may depict a political debate between members of two different parties. The social-networking system may divide the audio stream into multiple segments based on the identity of the speaker at the time as evidenced by the audio stream. The social-networking system may then determine vectors and determine labels for each different speaker in the video file. In particular embodiments, a user subsequently searching for one of the debaters may be directed to video segments showing that debater's speaking portions, without viewing the other party's speaker.

In particular embodiments, the social-networking system may determine that the audio stream for one or more video files has been altered. As an example and not by way of limitation, for a particular music video with a known audio track, the social-networking system may receive a modified version of the audio stream, which is meant to be a parody of the original song, with the same video depicted. The social-networking system may determine that there is some relationship between the original video and the altered video based on a comparison of the video data, but determine that one video file has been altered due to different vectors and/or labels being generated for the second video file. In particular embodiments, the social-networking system may use the audio stream vectors to determine that two video files with different video segments have the same audio and therefore the same labels based on the audio. In particular embodiments, the social-networking system may detect either instance (of identical audio but different video, or identical video but different audio) of modified video files and determine one or more additional labels. In particular embodiments, the social-networking system may flag one or more of such similar videos if the original video file is indicated to be under copyright or other protections to limit sharing of related material.

In particular embodiments, the social-networking system and the neural network may determine a general embedding space for vectors that may be used in the future for label-specific embedding spaces that have not yet been created. As an example and not by way of limitation, the social-networking system may anticipate that while there is yet no need to generate labels for a particular field, trends among users may make future labels for that field (or any unanticipated field) useful in the future. Rather than recalculating vectors in the new embedding space for each of the thousands or millions of video files stored with the social-networking system, the social-networking system may have already generated and stored larger vectors corresponding to the video files' audio streams. While storing such vectors may require some data store space on the social-networking system which may impose additional costs, when a new type of label is required, the social-networking system may only need to determine how to translate the general embedding space into the label-specific embedding space once, then perform such a translation for each video file to determine the new label, which may be computationally less expensive than re-determining the audio streams and vectors from scratch.

FIG. 1 illustrates an example method 100 for determining a label to be associated with a video file. The method may begin at step 110, where a video file is received. As an example and not by way of limitation, a social-networking system may receive a video file uploaded from a user or another entity. As another example and not by way of limitation, a computing system may access a video file already stored on a data store of the computing system. At step 120, the audio stream of the video file may be accessed. As an example and not by way of limitation, the computing system that receives the video file may extract the audio data from the video file and generate the audio stream for the full video. At step 130, a vector may be generated based on the audio stream. In particular embodiments, the vector may be an n-dimensional vector that comprises data from the audio stream. In particular embodiments, multiple vectors may be generated for different portions of the audio stream In particular embodiments, the multiple vectors may be separated based on time segments. At step 140, a label-embedding space may be accessed. In particular embodiments, the label-embedding space may be a general label-embedding space used for the audio stream vectors. In particular embodiments, the label-embedding space may be unique to a particular type of label. In particular embodiments, the label-embedding space is selected from a plurality of available label-embedding spaces based on the type of the label. In particular embodiments, the types of labels may include:

a language of the video, a genre of the video, a maturity rating of the video, a topic associated with the video, or whether the video contains objectionable content and should be flagged. In particular embodiments, the label-embedding space may have n number of dimensions, matching the number of dimensions of the vector. In particular embodiments, the label-embedding space may be trained using a neural network and a plurality of labeled videos. In particular embodiments, the training may include determining a vector for each of the plurality of labeled videos, and assigning one or more regions corresponding to the vectors in the label-embedding space with the respective labels. In particular embodiments, a general embedding space may be created from a plurality of label-embedding spaces. A new label-embedding space may be created for a new type of label based on the general embedding space. At step 150, a region of the label-embedding space corresponding to the vector may be determined. In particular embodiments, different regions of the label-embedding space may be associated with different labels. In particular embodiments, the regions may be adjusted based on image recognition performed on one or more frames of the video file. In particular embodiments, different regions may be determined for different segments of the video file. Different segments may be determine upon determining one or more scene transitions of the video file. One or more timestamps in the video file may be used to determine the boundaries of the video segments. The determination of segments of the audio stream may include using audio recognition to separate one or more speakers in the video file. In particular embodiments, the different vectors corresponding to different segments of a video file may be combined into a single representative vector for the video file. At step 160, the label associated with the determined region of the label-embedding space may be associated with the video file. In particular embodiments, the labeled video files may be made accessible to one or more users. An indication may be received that one or more users have viewed or interacted with the video file. Based on the users who have interacted with the video, it may be determined whether the labels should be changed. Changing the label may include removing a particular label.

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates an example method for determining labels to be associated with a video file including the particular steps of the method of FIG. 1, this disclosure contemplates any suitable method for determining labels to be associated with a video file including any suitable steps, which may include all, some, or none of the steps of the method of FIG. 1, where appropriate. Furthermore, although this disclosure describes and illustrates particular components, devices, or systems carrying out particular steps of the method of FIG. 1, this disclosure contemplates any suitable combination of any suitable components, devices, or systems carrying out any suitable steps of the method of FIG. 1.

Figure 2:
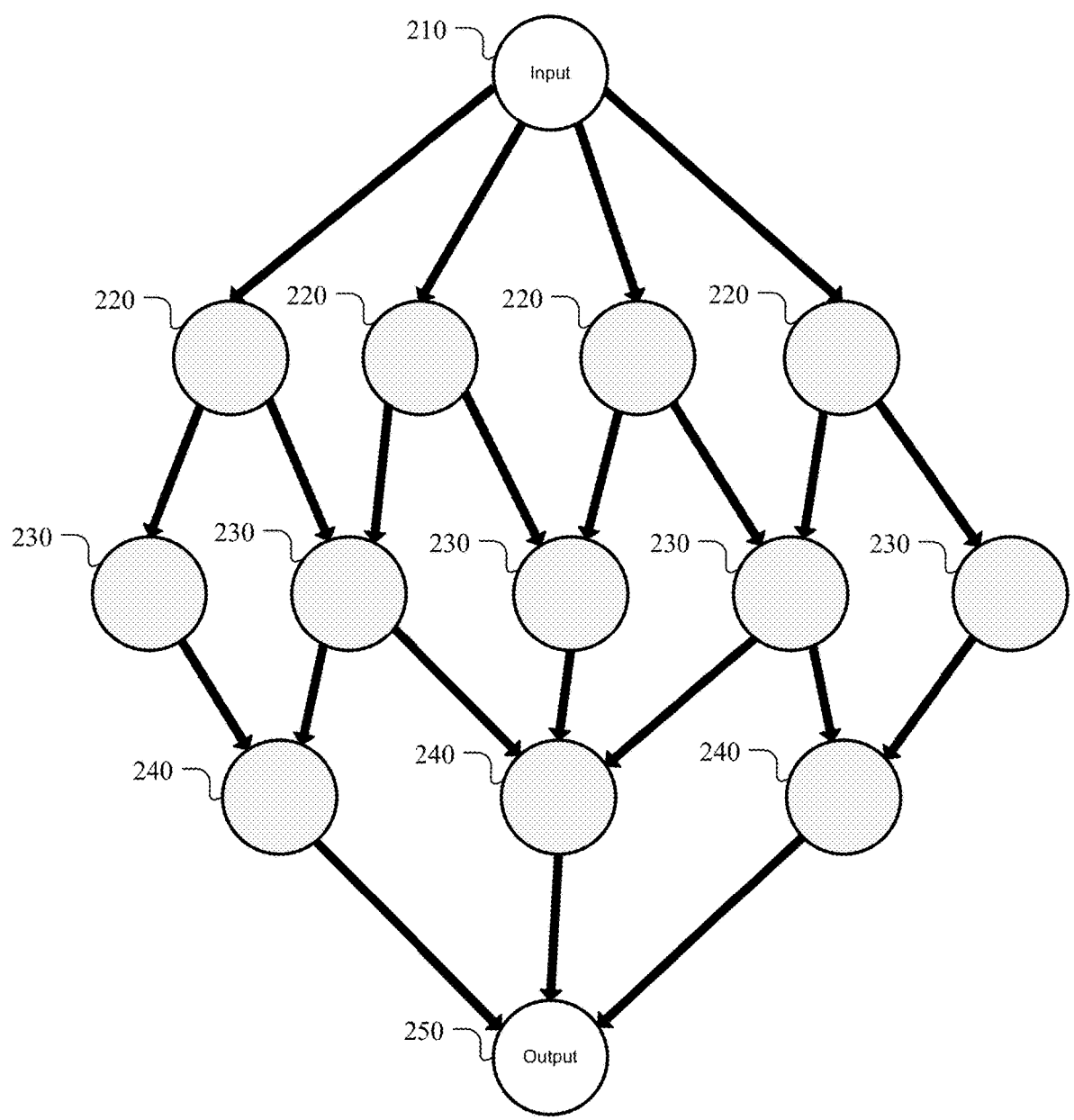
FIG. 2 illustrates an example neural network used to determine vectors for an audio stream of a video file.

FIG. 2 illustrates an example of a neural network that may be used to determine labels and embedding spaces for audio streams. In particular embodiments, a neural network may comprise a plurality of neurons 220-240. In particular embodiments, each individual neuron may be trained to receive a type of input data and provide a particular output based on the input data. In particular embodiments, each individual neuron may consider a small aspect or narrow feature of a total set of input data in order to generate its output, and the output of the entire neural network may be directed to the entire set of input data. In the example of FIG. 2, a set of input data 210 may be first provided to a set of neurons 220 acting as a first layer. In particular embodiments, each individual neuron 220 may receive only a subset of the total input from 210. In particular embodiments, each individual neuron 220 may receive identical copies of the input from 210. In the example of FIG. 2, each neuron 220 may receive input and generate an output to be sent to the next layer of neurons 230. In particular embodiments, the second layer of neurons 230 may each receive identical copies of output from the neurons 220. In particular embodiments, each of the neurons 230 may receive a subset of the data output by the neurons 220. In particular embodiments, the layer of neurons 230 may further receive additional data from the original input 210. In the example of FIG. 2, the neurons 230 may send their output data to the next layer of neurons 240. In particular embodiments, each neuron 240 may receive a subset of the output data from the layer of neurons 230. In particular embodiments, each neuron 240 may receive all of the output data for the layer of neurons 230. In the example of FIG. 2, the neurons 240 send their output data to be combined into a single output 250. In particular embodiments, the final output data from each of the neurons 240 may be kept separate, or combined. In particular embodiments, a neural network such as the example depicted in FIG. 2 may be used to determine a vector for an audio stream. In such an example, the data for the audio stream or a segment of the audio stream may be used as the input 210. The data from the audio stream may be received by one or more neurons 220, who each determine a particular output for a particular portion of the input 210. In the example of FIG. 2, the particular output data from neurons 220 are sent to neurons 230 then on to neurons 240. In this example, the total output data is then combined into a single output 250 which may correspond to the determined vector.

Figure 3:
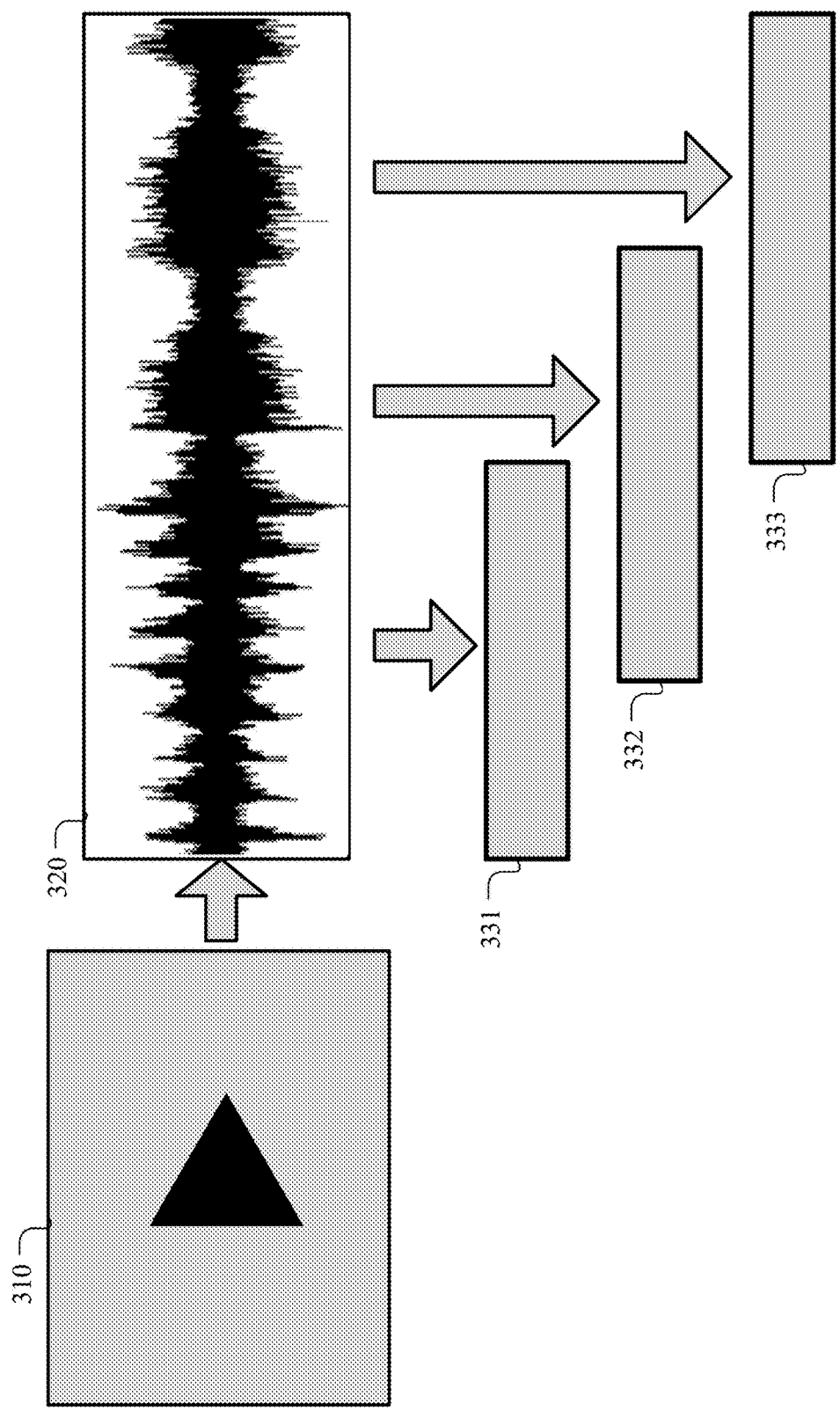
FIG. 3 illustrates an example of audio stream segments generated from a video file.

FIG. 3 illustrates an example method for accessing a video file and determining one or more segments to convert into vectors. In the example of FIG. 3, a video 310 may be received by a computing system. An audio stream 320 corresponding to the video 310 may be accessed. In particular embodiments, the audio stream 320 may be a .WAV file or other formatted file within the video file. In the example of FIG. 3, the audio stream 320 may correspond to the entire duration of video 310. In the example of FIG. 3, the audio stream 320 may be divided into three segments based on the duration of the video, such that the first segment 331 corresponds to a first portion of the audio stream, the second segment 332 corresponds to a middle portion of the audio stream, and the third segment 333 corresponds to a last portion of the audio stream. In particular embodiments, the social-networking system may determine vectors for each of the audio stream segments 331-333. In particular embodiments, the social-networking system may determine multiple vectors for each of the segments 331-333.

Figure 4:
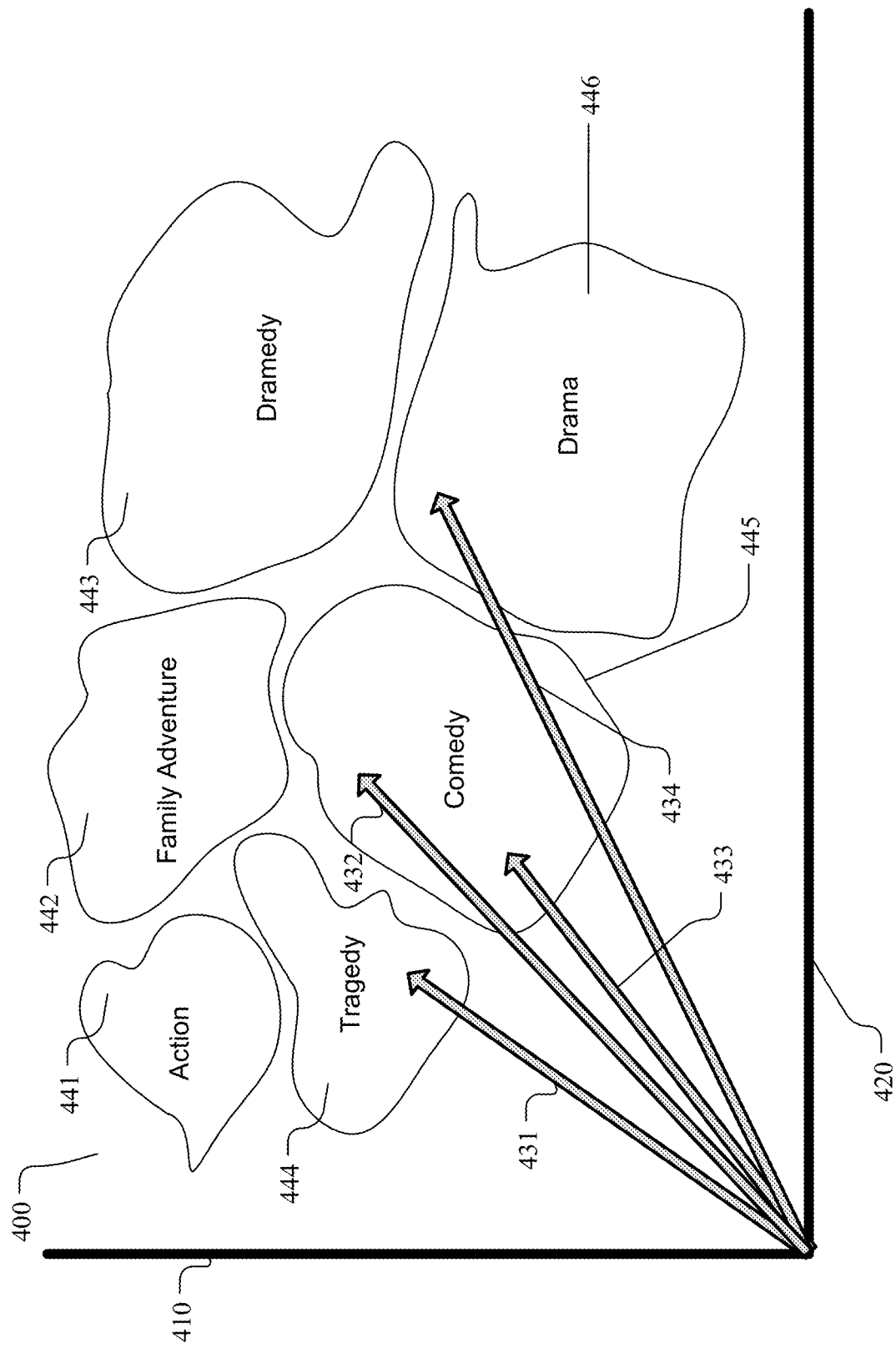
FIG. 4 illustrates an example embedding space for determining labelled regions corresponding to one or more vectors in the embedding space.

FIG. 4 illustrates an example embedding space 400 for determining one or more regions to associate labels. In the example of FIG. 4, for illustrative purposes the embedding space 400 has an n-dimension of two. In particular embodiments, the embedding space may have a much higher number of dimensions, based on the method utilized to generate the vectors. In particular embodiments, the number of dimensions used may be determined by the neural network based on optimizing the need to differentiate different types of audio files while reducing computational expense. In the two-dimensional embedding space 400 of FIG. 4, the vectors 431-434 may have corresponding values in the two dimensions 410 and 420. The values of the vectors 431-434 may also correspond to regions 441-446 in embedding space 400 which have previously been assigned labels. In the example of FIG. 4, the regions 441-446 may correspond to various genres for video files. In particular embodiments, the regions may be previously determined by using a neural network and a set of pre-labeled video files to determine the regions of the embedding space to which the labeled vectors correspond. As an example and not by way of limitation, in the example of FIG. 4, the region 446 for "drama" may have been determined by calculating that most or all video files already labeled as "drama" had vectors in the embedding space 400 which fell within the region 446, while video files labeled as "comedy" had vectors in the embedding space 400 which fell within the region 445. In particular embodiments, the one or more regions 441-446 of the embedding space 400 may have no overlapping regions, such that a single vector may not correspond to two distinct regions. In particular embodiments, there may be some overlap between regions, so that a single vector, for example, could correspond to the regions for tragedy and comedy. In particular embodiments, for such overlapping regions, the social-networking system may associate both labels to the video file. In particular embodiments, the social-networking system may determine one or more other factors to consider when determining a label. As an example and not by way of limitation, the social-networking system may use information from a social graph indicating connections between an entity that shared the video file to one or more other nodes of the social graph.

In the example of FIG. 4, each of the vectors 431-434 may correspond to a segment of an audio stream for a particular video file to be labeled. In particular embodiments, the social-networking system may determine a single vector representing a mean value of vectors 431-434 to determine one region for the video file. In the example of FIG. 4, the average of the four vectors 431-434 would be within the region 445 corresponding to "comedy." In particular embodiments, the social-networking system may determine a region that contains at least a threshold number or proportion of the segment vectors. In the example of FIG. 4, the "comedy" region has two of the segment vectors, representing a 50% proportion of the total segments. In particular embodiments, the social-networking systems may weigh the individual segments separately when determining means or threshold numbers. As an example and not by way of limitation, the social-networking system may determine that vector 434 corresponds to the middle segment of the video file, and thus count it as having twice the weight of the other segments. In particular embodiments, this may adjust the mean or the total count of segments. In particular embodiments, the social-networking system may assign different labels to the different segments of the video based on the corresponding vectors. As an example and not by way of limitation, the social-networking system may determine that the portion of the video file corresponding to vector 431 may be labeled "tragedy," the portions corresponding to vectors 432 and 433 may be labeled "comedy," and the portion corresponding to vector 434 may be labeled "drama."

Figure 5B:
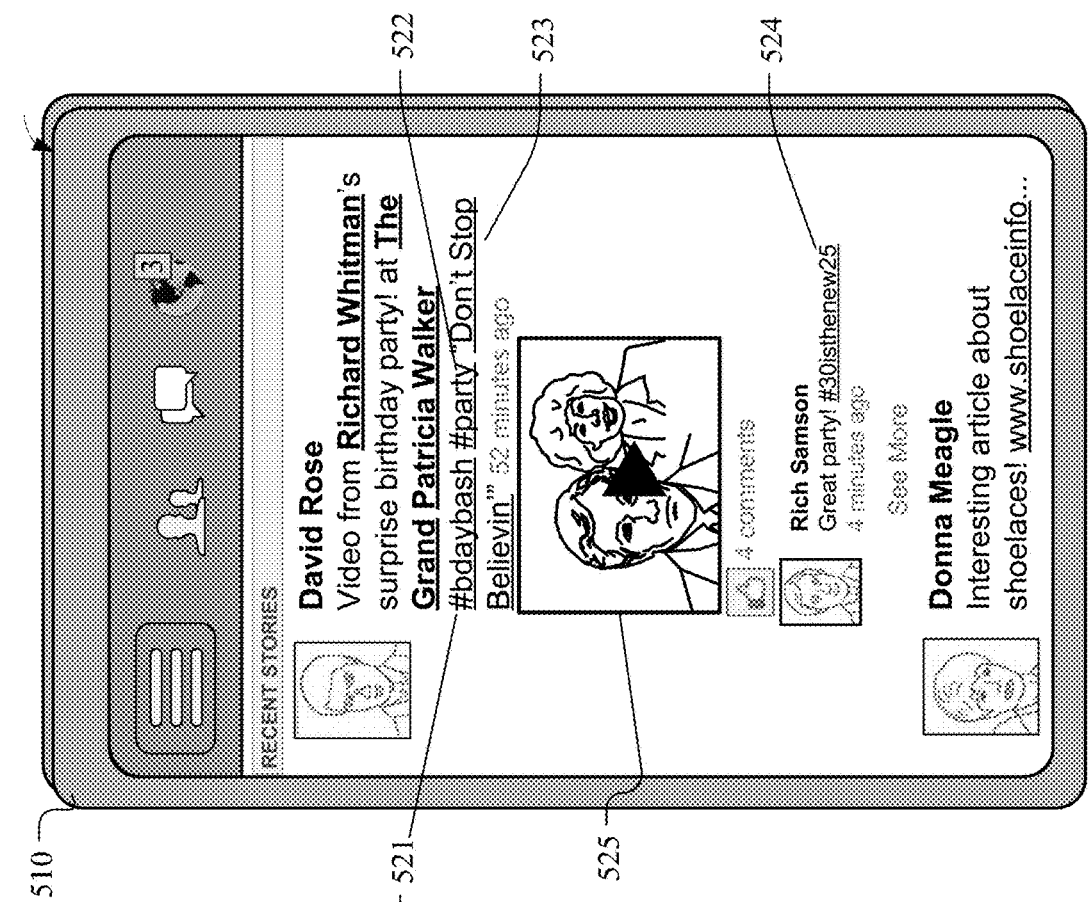
FIGS. 5A and 5B illustrate and example of a shared and labeled video on a social-networking system.
Figure 5A:
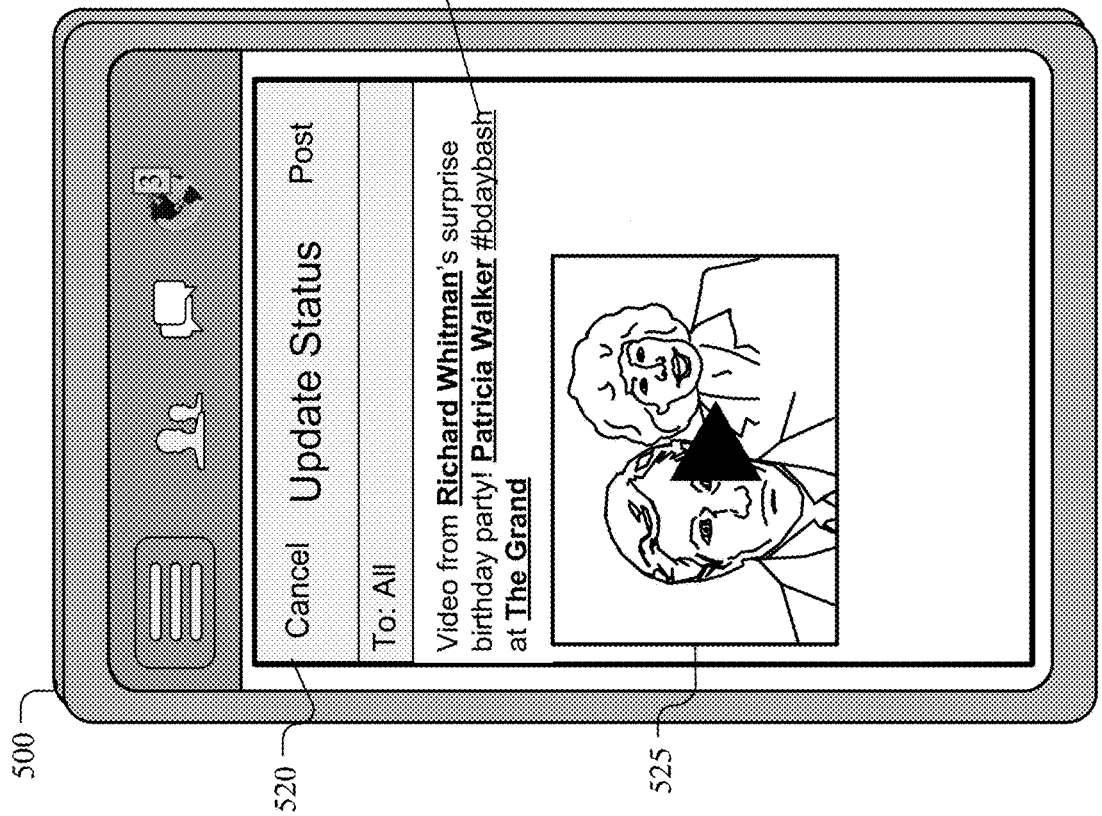

FIGS. 5A and 5B illustrate an example video file being uploaded by a first user and being viewed by a second user with labels added by the first user and visible to the second user. In particular embodiments, not all labels for a video file may be expressly visible to users, even though the users may be able to find the video file by searching for the label. In the example of FIG. 5A, a user may share a video file 525 through a first client system 500. In particular embodiments, the video 525 may be shared through a user interface 520 that allows the user to insert additional information, such as a particular label 521 to be appended to the video file. The user of client system 500 may then share the video 525 to the social-networking system. Subsequently, the social-networking system may provide the video 525 and the user post for the shared video to another user via another client system 510, as depicted in FIG. 5B. When the video is shared to the second user, the social-networking system may have accessed the audio file of video 525 and determined whether additional or replacement labels should be affixed to video 525. In the example of FIG. 5B, the social-networking system may determine additional labels for hashtags 522 or a song name 523. As an example and not by way of limitation, the social-networking system may determine that a particular song or type of music is playing in the video, identify the song or genre, and add a corresponding label 523 to the shared video 525. In particular embodiments, additional labels may be submitted by other users viewing the video 525. In the example of FIG. 5B, a user commenting on video 525 may add a hashtag 524, which may additionally be used as a label for the video 525. In particular embodiments, user comments may be used to generate additional labels without explicitly being input by the user. As an example and not by way of limitation, for the user comment adding the hashtag 524, the social-networking system may determine that the commenting user, the sharing user, and the other tagged users in the video are residents of Berkeley, Calif. In such an example, the social-networking system may add a label for "Berkeley" to the video 525, either explicitly such that it may be displayed to other users, or implicitly such that a user may search for "Berkeley" and be presented with video 525. In particular embodiments, a label pertaining to location may be confirmed by a location associated with the video 525 or a place tagged by the user post sharing the video.

System Overview

Figure 6:
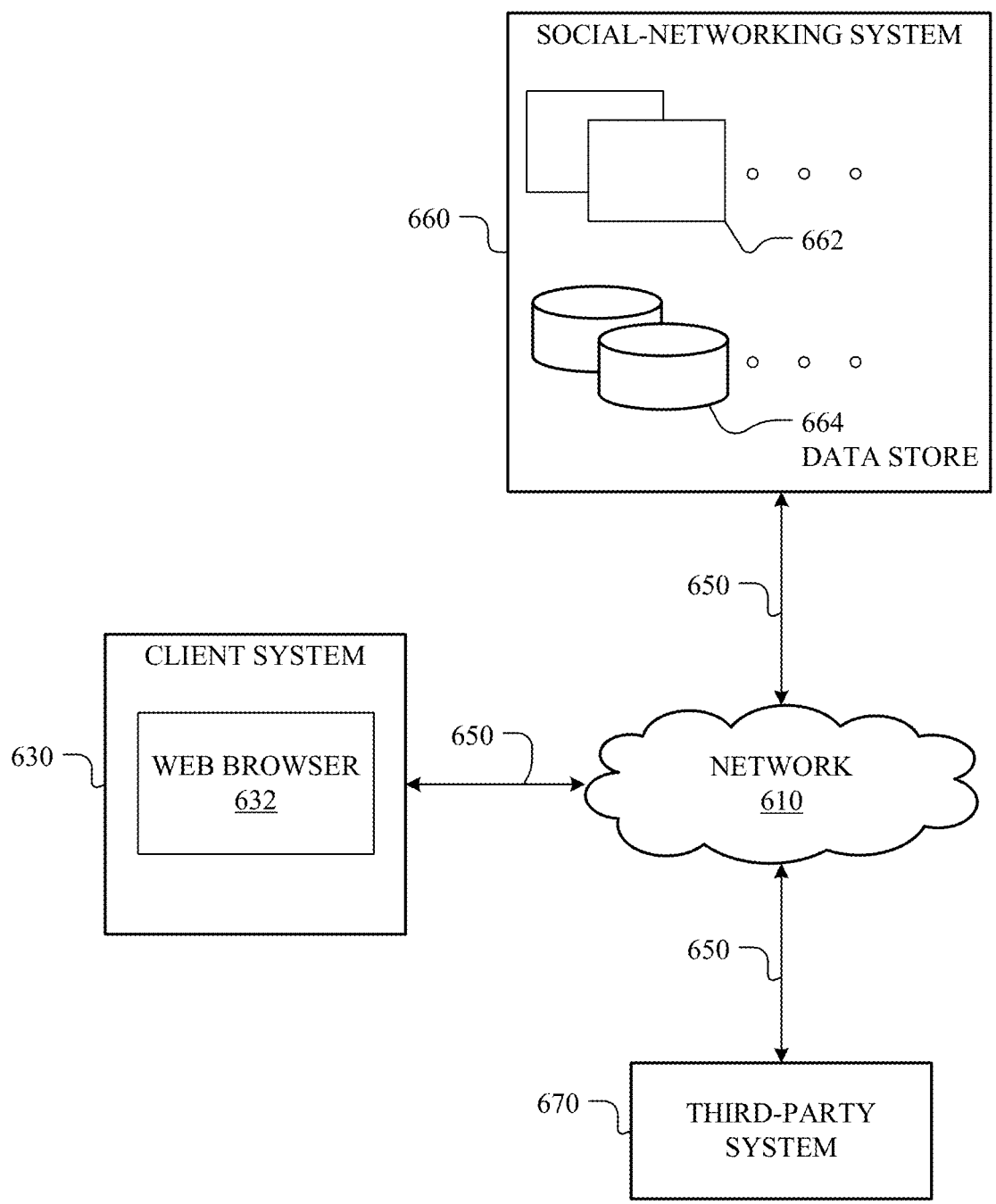
FIG. 6 illustrates an example network environment associated with a social-networking system.

FIG. 6 illustrates an example network environment 600 associated with a social-networking system. Network environment 600 includes a client system 630, a social-networking system 660, and a third-party system 670 connected to each other by a network 610. Although FIG. 6 illustrates a particular arrangement of client system 630, social-networking system 660, third-party system 670, and network 610, this disclosure contemplates any suitable arrangement of client system 630, social-networking system 660, third-party system 670, and network 610. As an example and not by way of limitation, two or more of client system 630, social-networking system 660, and third-party system 670 may be connected to each other directly, bypassing network 610. As another example, two or more of client system 630, social-networking system 660, and third-party system 670 may be physically or logically co-located with each other in whole or in part. Moreover, although FIG. 6 illustrates a particular number of client systems 630, social-networking systems 660, third-party systems 670, and networks 610, this disclosure contemplates any suitable number of client systems 630, social-networking systems 660, third-party systems 670, and networks 610. As an example and not by way of limitation, network environment 600 may include multiple client system 630, social-networking systems 660, third-party systems 670, and networks 610.

This disclosure contemplates any suitable network 610. As an example and not by way of limitation, one or more portions of network 610 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 610 may include one or more networks 610.

Links 650 may connect client system 630, social-networking system 660, and third-party system 670 to communication network 610 or to each other. This disclosure contemplates any suitable links 650. In particular embodiments, one or more links 650 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 650 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 650, or a combination of two or more such links 650. Links 650 need not necessarily be the same throughout network environment 600. One or more first links 650 may differ in one or more respects from one or more second links 650.

In particular embodiments, client system 630 may be an electronic device including hardware, software, or embedded logic components or a combination of two or more such components and capable of carrying out the appropriate functionalities implemented or supported by client system 630. As an example and not by way of limitation, a client system 630 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 630. A client system 630 may enable a network user at client system 630 to access network 610. A client system 630 may enable its user to communicate with other users at other client systems 630.

In particular embodiments, client system 630 may include a web browser 632, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 630 may enter a Uniform Resource Locator (URL) or other address directing the web browser 632 to a particular server (such as server 662, or a server associated with a third-party system 670), and the web browser 632 may generate a Hyper Text Transfer Protocol (HTTP) request and communicate the HTTP request to server. The server may accept the HTTP request and communicate to client system 630 one or more Hyper Text Markup Language (HTML) files responsive to the HTTP request. Client system 630 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 660 may be a network-addressable computing system that can host an online social network. Social-networking system 660 may generate, store, receive, and send social-networking data, such as, for example, user-profile data, concept-profile data, social-graph information, or other suitable data related to the online social network. Social-networking system 660 may be accessed by the other components of network environment 600 either directly or via network 610. As an example and not by way of limitation, client system 630 may access social-networking system 660 using a web browser 632, or a native application associated with social-networking system 660 (e.g., a mobile social-networking application, a messaging application, another suitable application, or any combination thereof) either directly or via network 610. In particular embodiments, social-networking system 660 may include one or more servers 662. Each server 662 may be a unitary server or a distributed server spanning multiple computers or multiple datacenters. Servers 662 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 662 may include hardware, software, or embedded logic components or a combination of two or more such components for carrying out the appropriate functionalities implemented or supported by server 662. In particular embodiments, social-networking system 660 may include one or more data stores 664. Data stores 664 may be used to store various types of information. In particular embodiments, the information stored in data stores 664 may be organized according to specific data structures. In particular embodiments, each data store 664 may be a relational, columnar, correlation, or other suitable database. Although this disclosure describes or illustrates particular types of databases, this disclosure contemplates any suitable types of databases. Particular embodiments may provide interfaces that enable a client system 630, a social-networking system 660, or a third-party system 670 to manage, retrieve, modify, add, or delete, the information stored in data store 664.

In particular embodiments, social-networking system 660 may store one or more social graphs in one or more data stores 664. In particular embodiments, a social graph may include multiple nodes—which may include multiple user nodes (each corresponding to a particular user) or multiple concept nodes (each corresponding to a particular concept)—and multiple edges connecting the nodes. Social-networking system 660 may provide users of the online social network the ability to communicate and interact with other users. In particular embodiments, users may join the online social network via social-networking system 660 and then add connections (e.g., relationships) to a number of other users of social-networking system 660 to whom they want to be connected. Herein, the term "friend" may refer to any other user of social-networking system 660 with whom a user has formed a connection, association, or relationship via social-networking system 660.

In particular embodiments, social-networking system 660 may provide users with the ability to take actions on various types of items or objects, supported by social-networking system 660. As an example and not by way of limitation, the items and objects may include groups or social networks to which users of social-networking system 660 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 660 or by an external system of third-party system 670, which is separate from social-networking system 660 and coupled to social-networking system 660 via a network 610.

In particular embodiments, social-networking system 660 may be capable of linking a variety of entities. As an example and not by way of limitation, social-networking system 660 may enable users to interact with each other as well as receive content from third-party systems 670 or other entities, or to allow users to interact with these entities through an application programming interfaces (API) or other communication channels.

In particular embodiments, a third-party system 670 may include one or more types of servers, one or more data stores, one or more interfaces, including but not limited to APIs, one or more web services, one or more content sources, one or more networks, or any other suitable components, e.g., that servers may communicate with. A third-party system 670 may be operated by a different entity from an entity operating social-networking system 660. In particular embodiments, however, social-networking system 660 and third-party systems 670 may operate in conjunction with each other to provide social-networking services to users of social-networking system 660 or third-party systems 670. In this sense, social-networking system 660 may provide a platform, or backbone, which other systems, such as third-party systems 670, may use to provide social-networking services and functionality to users across the Internet.

In particular embodiments, a third-party system 670 may include a third-party content object provider. A third-party content object provider may include one or more sources of content objects, which may be communicated to a client system 630. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 660 also includes user-generated content objects, which may enhance a user's interactions with social-networking system 660. User-generated content may include anything a user can add, upload, send, or "post" to social-networking system 660. As an example and not by way of limitation, a user communicates posts to social-networking system 660 from a client system 630. Posts may include data such as status updates or other textual data, location information, photos, videos, links, music or other similar data or media. Content may also be added to social-networking system 660 by a third-party through a "communication channel," such as a newsfeed or stream.

In particular embodiments, social-networking system 660 may include a variety of servers, sub-systems, programs, modules, logs, and data stores. In particular embodiments, social-networking system 660 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 660 may also include suitable components such as network interfaces, security mechanisms, load balancers, failover servers, management-and-network-operations consoles, other suitable components, or any suitable combination thereof. In particular embodiments, social-networking system 660 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 660 to one or more client systems 630 or one or more third-party system 670 via network 610. The web server may include a mail server or other messaging functionality for receiving and routing messages between social-networking system 660 and one or more client systems 630. An API-request server may allow a third-party system 670 to access information from social-networking system 660 by calling one or more APIs. An action logger may be used to receive communications from a web server about a user's actions on or off social-networking system 660. In conjunction with the action log, a third-party-content-object log may be maintained of user exposures to third-party-content objects. A notification controller may provide information regarding content objects to a client system 630. Information may be pushed to a client system 630 as notifications, or information may be pulled from client system 630 responsive to a request received from client system 630. Authorization servers may be used to enforce one or more privacy settings of the users of social-networking system 660. A privacy setting of a user determines how particular information associated with a user can be shared. The authorization server may allow users to opt in to or opt out of having their actions logged by social-networking system 660 or shared with other systems (e.g., third-party system 670), such as, for example, by setting appropriate privacy settings. Third-party-content-object stores may be used to store content objects received from third parties, such as a third-party system 670. Location stores may be used for storing location information received from client systems 630 associated with users. Advertisement-pricing modules may combine social information, the current time, location information, or other suitable information to provide relevant advertisements, in the form of notifications, to a user.

Social Graphs

Figure 7:
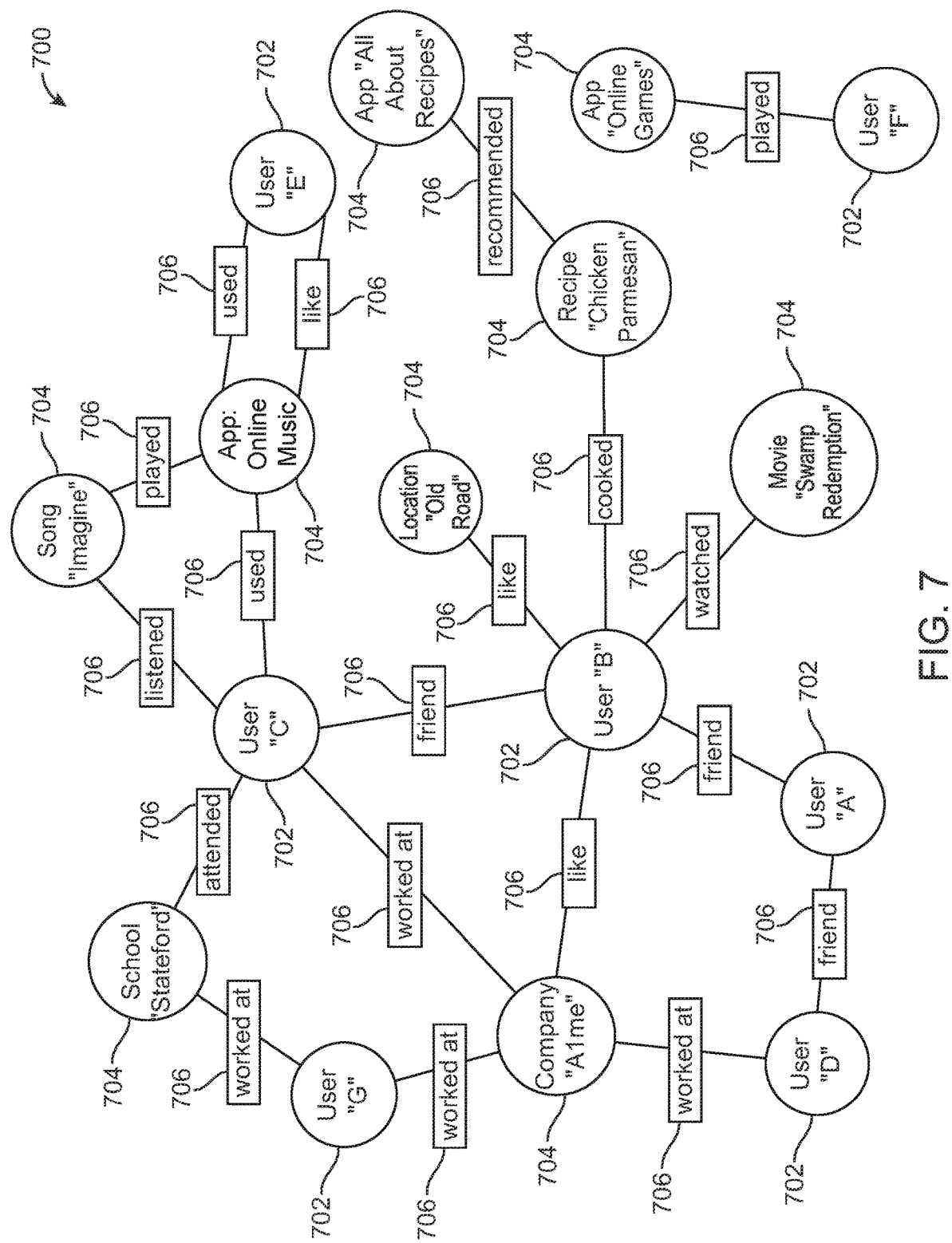
FIG. 7 illustrates an example social graph.

FIG. 7 illustrates example social graph 700. In particular embodiments, social-networking system 660 may store one or more social graphs 700 in one or more data stores. In particular embodiments, social graph 700 may include multiple nodes—which may include multiple user nodes 702 or multiple concept nodes 704—and multiple edges 706 connecting the nodes. Example social graph 700 illustrated in FIG. 7 is shown, for didactic purposes, in a two-dimensional visual map representation. In particular embodiments, a social-networking system 660, client system 630, or third-party system 670 may access social graph 700 and related social-graph information for suitable applications. The nodes and edges of social graph 700 may be stored as data objects, for example, in a data store (such as a social-graph database). Such a data store may include one or more searchable or queryable indexes of nodes or edges of social graph 700.

In particular embodiments, a user node 702 may correspond to a user of social-networking system 660. As an example and not by way of limitation, a user may be an individual (human user), an entity (e.g., an enterprise, business, or third-party application), or a group (e.g., of individuals or entities) that interacts or communicates with or over social-networking system 660. In particular embodiments, when a user registers for an account with social-networking system 660, social-networking system 660 may create a user node 702 corresponding to the user, and store the user node 702 in one or more data stores. Users and user nodes 702 described herein may, where appropriate, refer to registered users and user nodes 702 associated with registered users. In addition or as an alternative, users and user nodes 702 described herein may, where appropriate, refer to users that have not registered with social-networking system 660. In particular embodiments, a user node 702 may be associated with information provided by a user or information gathered by various systems, including social-networking system 660. As an example and not by way of limitation, a user may provide his or her name, profile picture, contact information, birth date, sex, marital status, family status, employment, education background, preferences, interests, or other demographic information. In particular embodiments, a user node 702 may be associated with one or more data objects corresponding to information associated with a user. In particular embodiments, a user node 702 may correspond to one or more webpages.

In particular embodiments, a concept node 704 may correspond to a concept. As an example and not by way of limitation, a concept may correspond to a place (such as, for example, a movie theater, restaurant, landmark, or city); a website (such as, for example, a website associated with social-network system 660 or a third-party website associated with a web-application server); an entity (such as, for example, a person, business, group, sports team, or celebrity); a resource (such as, for example, an audio file, video file, digital photo, text file, structured document, or application) which may be located within social-networking system 660 or on an external server, such as a web-application server; real or intellectual property (such as, for example, a sculpture, painting, movie, game, song, idea, photograph, or written work); a game; an activity; an idea or theory; an object in a augmented/virtual reality environment;

another suitable concept; or two or more such concepts. A concept node 704 may be associated with information of a concept provided by a user or information gathered by various systems, including social-networking system 660. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 704 may be associated with one or more data objects corresponding to information associated with concept node 704. In particular embodiments, a concept node 704 may correspond to one or more webpages.

In particular embodiments, a node in social graph 700 may represent or be represented by a webpage (which may be referred to as a "profile page"). Profile pages may be hosted by or accessible to social-networking system 660. Profile pages may also be hosted on third-party websites associated with a third-party system 670. As an example and not by way of limitation, a profile page corresponding to a particular external webpage may be the particular external webpage and the profile page may correspond to a particular concept node 704. Profile pages may be viewable by all or a selected subset of other users. As an example and not by way of limitation, a user node 702 may have a corresponding user-profile page in which the corresponding user may add content, make declarations, or otherwise express himself or herself. As another example and not by way of limitation, a concept node 704 may have a corresponding concept-profile page in which one or more users may add content, make declarations, or express themselves, particularly in relation to the concept corresponding to concept node 704.

In particular embodiments, a concept node 704 may represent a third-party webpage or resource hosted by a third-party system 670. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 630 to send to social-networking system 660 a message indicating the user's action. In response to the message, social-networking system 660 may create an edge (e.g., a check-in-type edge) between a user node 702 corresponding to the user and a concept node 704 corresponding to the third-party webpage or resource and store edge 706 in one or more data stores.

In particular embodiments, a pair of nodes in social graph 700 may be connected to each other by one or more edges 706. An edge 706 connecting a pair of nodes may represent a relationship between the pair of nodes. In particular embodiments, an edge 706 may include or represent one or more data objects or attributes corresponding to the relationship between a pair of nodes. As an example and not by way of limitation, a first user may indicate that a second user is a "friend" of the first user. In response to this indication, social-networking system 660 may send a "friend request" to the second user. If the second user confirms the "friend request," social-networking system 660 may create an edge 706 connecting the first user's user node 702 to the second user's user node 702 in social graph 700 and store edge 706 as social-graph information in one or more of data stores 664. In the example of FIG. 7, social graph 700 includes an edge 706 indicating a friend relation between user nodes 702 of user "A" and user "B" and an edge indicating a friend relation between user nodes 702 of user "C" and user "B." Although this disclosure describes or illustrates particular edges 706 with particular attributes connecting particular user nodes 702, this disclosure contemplates any suitable edges 706 with any suitable attributes connecting user nodes 702. As an example and not by way of limitation, an edge 706 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 700 by one or more edges 706.

In particular embodiments, an edge 706 between a user node 702 and a concept node 704 may represent a particular action or activity performed by a user associated with user node 702 toward a concept associated with a concept node 704. As an example and not by way of limitation, as illustrated in FIG. 7, a user may "like," "attended," "played," "listened," "cooked," "worked at," or "watched" a concept, each of which may correspond to an edge type or subtype. A concept-profile page corresponding to a concept node 704 may include, for example, a selectable "check in" icon (such as, for example, a clickable "check in" icon) or a selectable "add to favorites" icon. Similarly, after a user clicks these icons, social-networking system 660 may create a "favorite" edge or a "check in" edge in response to a user's action corresponding to a respective action. As another example and not by way of limitation, a user (user "C") may listen to a particular song ("Imagine") using a particular application (an online music application). In this case, social-networking system 660 may create a "listened" edge 706 and a "used" edge (as illustrated in FIG. 7) between user nodes 702 corresponding to the user and concept nodes 704 corresponding to the song and application to indicate that the user listened to the song and used the application. Moreover, social-networking system 660 may create a "played" edge 706 (as illustrated in FIG. 7) between concept nodes 704 corresponding to the song and the application to indicate that the particular song was played by the particular application. In this case, "played" edge 706 corresponds to an action performed by an external application on an external audio file (the song "Imagine"). Although this disclosure describes particular edges 706 with particular attributes connecting user nodes 702 and concept nodes 704, this disclosure contemplates any suitable edges 706 with any suitable attributes connecting user nodes 702 and concept nodes 704. Moreover, although this disclosure describes edges between a user node 702 and a concept node 704 representing a single relationship, this disclosure contemplates edges between a user node 702 and a concept node 704 representing one or more relationships. As an example and not by way of limitation, an edge 706 may represent both that a user likes and has used at a particular concept. Alternatively, another edge 706 may represent each type of relationship (or multiples of a single relationship) between a user node 702 and a concept node 704 (as illustrated in FIG. 7 between user node 702 for user "E" and concept node 704).

In particular embodiments, social-networking system 660 may create an edge 706 between a user node 702 and a concept node 704 in social graph 700. As an example and not by way of limitation, a user viewing a concept-profile page (such as, for example, by using a web browser or a special-purpose application hosted by the user's client system 630) may indicate that he or she likes the concept represented by the concept node 704 by clicking or selecting a "Like" icon, which may cause the user's client system 630 to send to social-networking system 660 a message indicating the user's liking of the concept associated with the concept-profile page. In response to the message, social-networking system 660 may create an edge 706 between user node 702 associated with the user and concept node 704, as illustrated by "like" edge 706 between the user and concept node 704. In particular embodiments, social-networking system 660 may store an edge 706 in one or more data stores. In particular embodiments, an edge 706 may be automatically formed by social-networking system 660 in response to a particular user action. As an example and not by way of limitation, if a first user uploads a picture, watches a movie, or listens to a song, an edge 706 may be formed between user node 702 corresponding to the first user and concept nodes 704 corresponding to those concepts. Although this disclosure describes forming particular edges 706 in particular manners, this disclosure contemplates forming any suitable edges 706 in any suitable manner.

Systems and Methods

Figure 8:
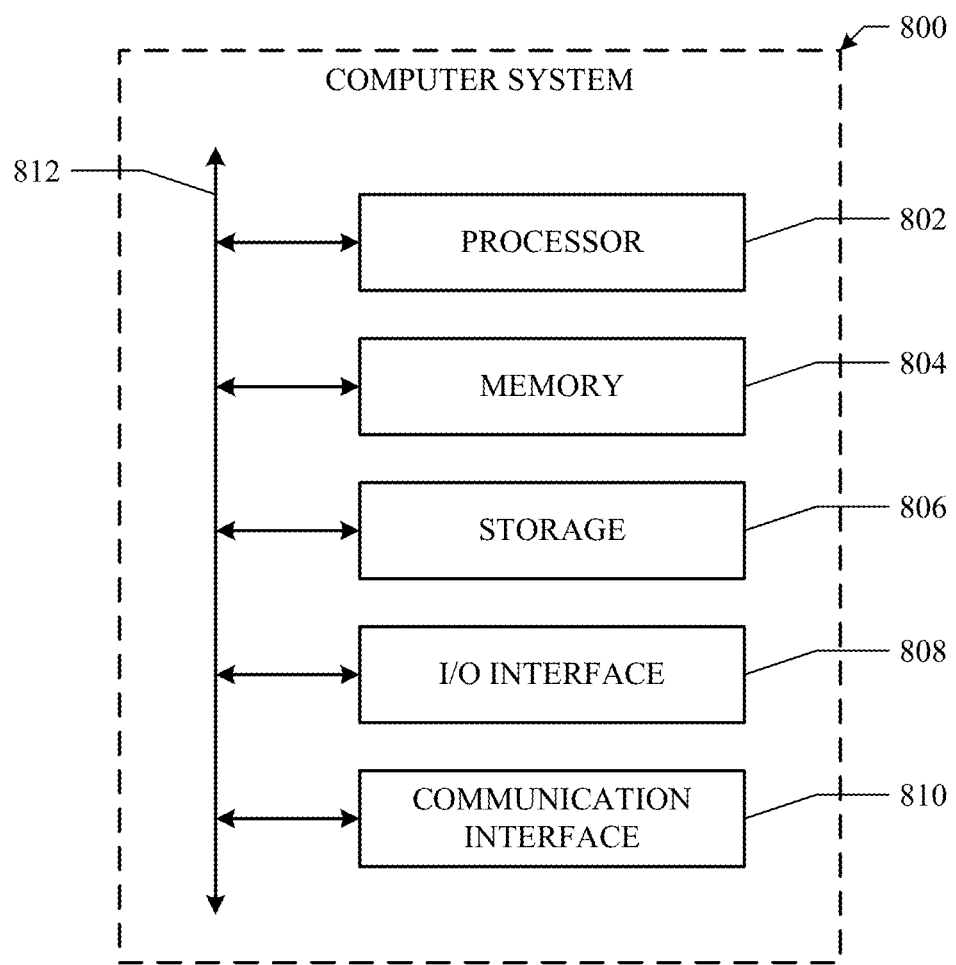
FIG. 8 illustrates an example computer system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    by a computing device, receiving a video file, the video file comprising an audio stream;
    by the computing device, accessing the audio stream of the video file;
    by the computing device, generating, based on the audio stream, a vector representing the audio stream, wherein the vector has a particular number of dimensions (N);
    by the computing device, accessing a label-embedding space, wherein the label-embedding space has:
        the particular number of dimensions (N); and
        a plurality of regions, wherein each region from the plurality of regions corresponds to a label from a plurality of labels;
    by the computing device, determining a region of the label-embedding space that corresponds to the vector representing the audio stream, wherein the region is associated with a particular label; and
    by the computing device, associating the particular label with the video file.

2. The method of claim 1, wherein the particular label comprises:
    a language in the video;
    a genre of the video;
    a maturity rating of the video;
    a topic associated with the video; or
    whether the video should be flagged for objectionable content.

3. The method of claim 2, wherein the label-embedding space is selected from one of a plurality of label-embedding spaces based on a type of the label.

4. The method of claim 1, wherein the label-embedding space is trained using a neural network and a plurality of labeled videos.

5. The method of claim 4, wherein training the label-embedding space comprises:
    for each of a plurality of labeled videos, determining a vector corresponding only to an audio file of the labeled video; and
    assigning one or more regions corresponding to the vectors in the label-embedding space with the respective labels.

6. The method of claim 1, further comprising:
    making the labeled video file accessible to one or more users of a social-networking system;
    receiving an indication that one or more of the users have viewed or interacted with the video file; and
    based on the indication and information associated with the one or more users, determine whether the particular label should be changed.

7. The method of claim 6, further comprising: based on the indication and information associated with the one or more users, determining whether the regions of the label-embedded space should be adjusted so that the video file no longer corresponds to the particular label.

8. The method of claim 1, wherein the regions of the label-embedding space are further adjusted based on an image recognition method performed on the video file.

9. The method of claim 1, further comprising:
    dividing the received video file into a plurality of segments; and
    for each segment, determining a particular label.

10. The method of claim 9, wherein dividing the received video file into a plurality of segments is based on determining one or more scene transitions in the video file.

11. The method of claim 9, wherein dividing the received video file into a plurality of segments is based on one or more timestamps in the video file.

12. The method of claim 9, wherein dividing the received video file into a plurality of segments is based on using only audio recognition to determine segments based on separating one or more speakers.

13. The method of claim 1, further comprising:
    determining a new type of label to assign to a video file;
    accessing a general embedding space based on a plurality of label-embedding spaces; and
    creating a new label-embedding space based on the general embedding space and one or more labeled video files.

14. The method of claim 1, wherein generating the vector comprises:
    dividing the video file into a plurality of segments, wherein each particular segment overlaps the subsequent segment;
    determining, for each segment, a vector having the particular number of dimensions; and
    pooling the individual vectors for the plurality of segments into a single vector that is representative of the video file.

15. One or more computer-readable non-transitory storage media embodying software that is operable when executed to:
    receive a video file, the video file comprising an audio stream;
    access the audio stream of the video file;
    generate, based on the audio stream, a vector representing the audio stream, wherein the vector has a particular number of dimensions (N);

access a label-embedding space, wherein the label-embedding space has:
the particular number of dimensions (N); and
a plurality of regions, wherein each region from the plurality of regions corresponds to a label from a plurality of labels;
determine a region of the label-embedding space that corresponds to the vector representing the audio stream, wherein the region is associated with a particular label; and
associate the particular label with the video file.

16. The media of claim 15, wherein the particular label comprises:
a language in the video;
a genre of the video;
a maturity rating of the video;
a topic associated with the video; or
whether the video should be flagged for objectionable content.

17. The media of claim 16, wherein the label-embedding space is selected from one of a plurality of label-embedding spaces based on a type of the label.

18. The media of claim 15, wherein the label-embedding space is trained using a neural network and a plurality of labeled videos.

19. The media of claim 18, wherein training the label-embedding space comprises:
for each of a plurality of labeled videos, determining a vector corresponding only to an audio file of the labeled video; and
assigning one or more regions corresponding to the vectors in the label-embedding space with the respective labels.

20. A system comprising: one or more processors; and a memory coupled to the processors comprising instructions executable by the processors, the processors being operable when executing the instructions to:
receive a video file, the video file comprising an audio stream;
access the audio stream of the video file;
generate, based on the audio stream, a vector representing the audio stream, wherein the vector has a particular number of dimensions (N);
access a label-embedding space, wherein the label-embedding space has:
the particular number of dimensions (N); and
a plurality of regions, wherein each region from the plurality of regions corresponds to a label from a plurality of labels;
determine a region of the label-embedding space that corresponds to the vector representing the audio stream, wherein the region is associated with a particular label; and associate the particular label with the video file.

* * * * *